United States Patent
Allen, Jr.

(10) Patent No.: US 6,240,743 B1
(45) Date of Patent: Jun. 5, 2001

(54) GAS VENTING DEVICE FOR DRY ICE PELLETIZER AND METHODS FOR RETROFITTING SAME ONTO EXISTING DRY ICE PELLETIZERS

(76) Inventor: Russel G. Allen, Jr., 4605 Tex Woods, San Antonio, TX (US) 78249

(*) Notice: Subject to any disclaimer, the term of this patent is extended or adjusted under 35 U.S.C. 154(b) by 0 days.

(21) Appl. No.: 09/435,671

(22) Filed: Nov. 8, 1999

(51) Int. Cl.⁷ ...................................................... F25J 1/00
(52) U.S. Cl. ............................................................ 62/605
(58) Field of Search ............................... 62/602, 604, 605

(56) References Cited

U.S. PATENT DOCUMENTS

| | | | |
|---|---|---|---|
| 3,576,112 | * 4/1971 | Frost | ........................................ 62/605 |
| 3,660,986 | 5/1972 | Hardt et al. . | |
| 3,670,516 | 6/1972 | Duron et al. . | |
| 3,786,645 | 1/1974 | Cann . | |
| 5,385,023 | 1/1995 | Montemayor et al. . | |
| 5,419,138 | * 5/1995 | Anderson et al. | ...................... 62/605 |
| 5,473,903 | * 12/1995 | Lloyd et al. | ............................ 62/605 |
| 5,735,140 | 4/1998 | Becker et al. . | |

\* cited by examiner

Primary Examiner—William Doerrler

(57) ABSTRACT

A gas venting device for dry ice pelletizers and a method for retrofitting the venting device onto an existing piston and cylinder type dry ice pelletizer. The venting device consists of a venting mesh having wires with a generally trapezoidal cross section. The venting mesh is attached to a forward flange at one end and a rear flange at the opposite end. The two flanges are separated by spacer bars. The spacer bars absorb the compressive force exerted by four rods that extend the entire length of the dry ice pelletizer. Without the spacer bars, venting mesh would buckle under this compressive force. The forward flange is attached to an extrusion cylinder and the rear flange is attached to a home cylinder. The extrusion flange is attached at its other end to a die for dry ice pellet extrusion. The home cylinder is attached at its other end to the rest of the dry ice pelletizer.

11 Claims, 4 Drawing Sheets

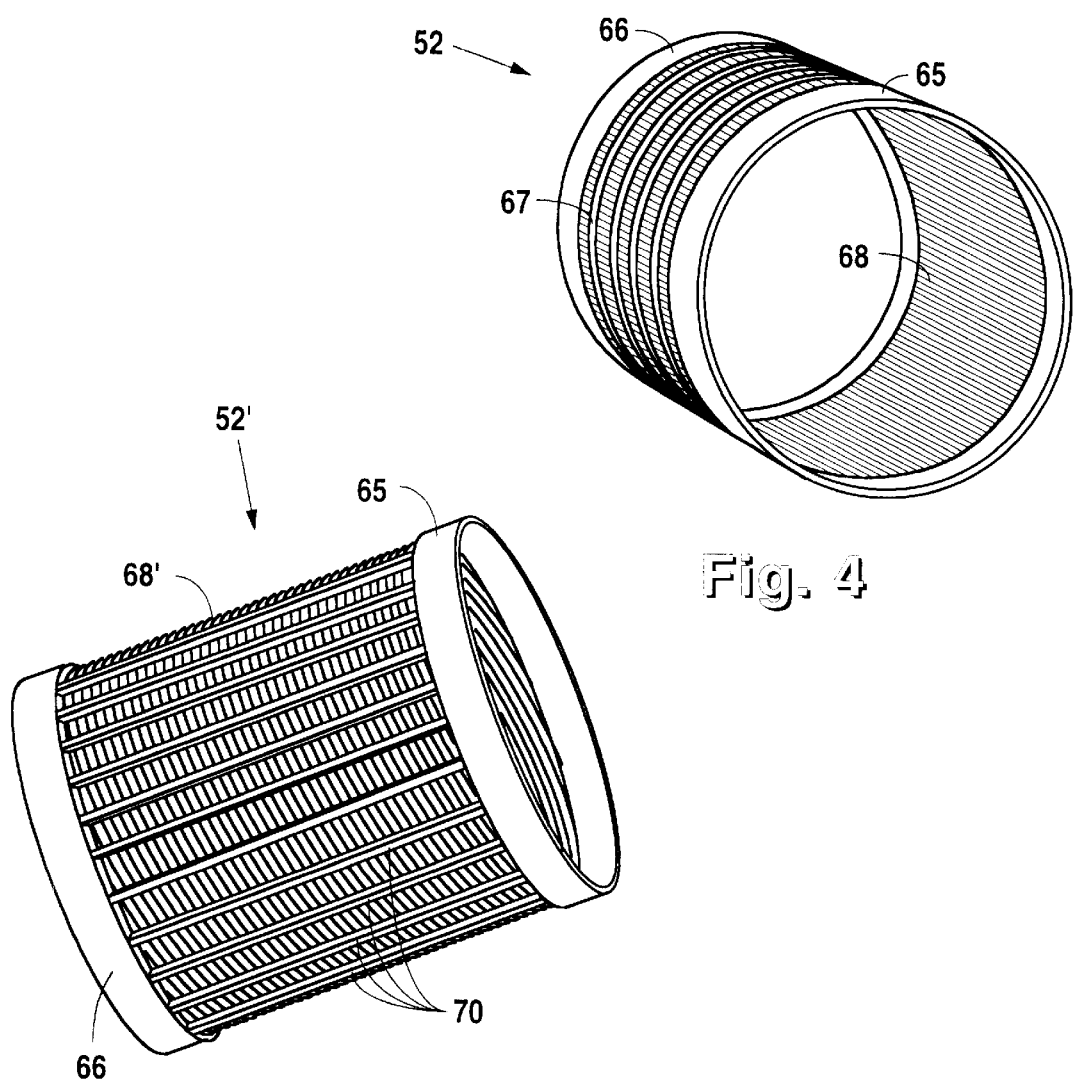
Fig. 4
Fig. 4A
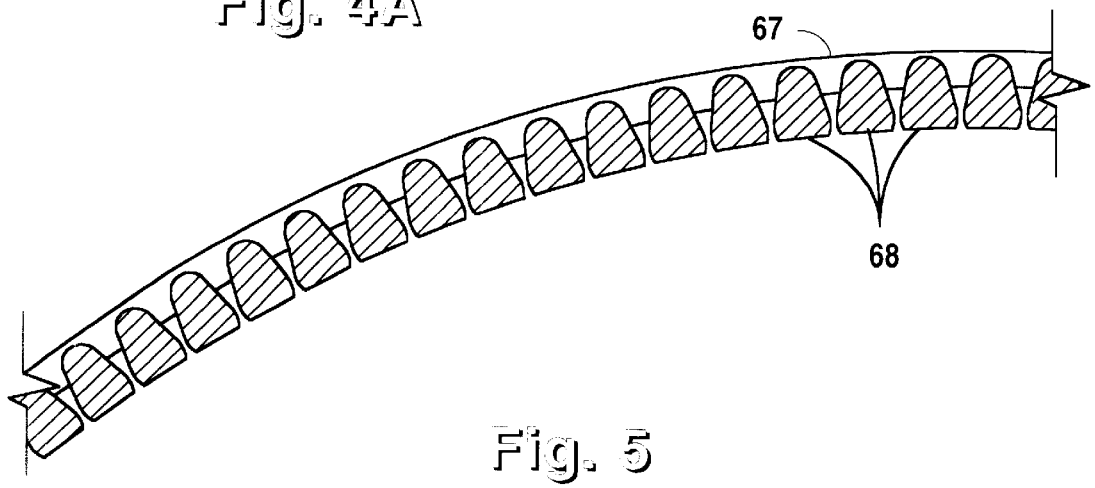
Fig. 5

GAS VENTING DEVICE FOR DRY ICE PELLETIZER AND METHODS FOR RETROFITTING SAME ONTO EXISTING DRY ICE PELLETIZERS

BACKGROUND OF THE INVENTION

1. Field of the Invention

The present invention relates generally to the field of manufacturing dry ice. More specifically, the present invention is a venting mechanism and a method of retrofitting this venting mechanism onto existing dry ice pelletizers to increase production rates.

2. Background Information

Solid state carbon dioxide ($CO_2$), otherwise known as dry ice, is used in a vast array of applications. For example, dry ice is used in the processing and preservation of meats and other foods. Dry ice is an ideal method of preserving food because it sublimes directly from its solid phase to its gaseous phase, leaving no color, odor, taste, or residue and causes no lingering deleterious effects on food. In cooling and preserving food, dry ice pellets are placed directly onto the food to rapidly cool it below some specified temperature to prevent spoilage, both during processing and prior to refrigerated storage.

Traditionally, dry ice is produced and distributed in blocks. These blocks are large and cumbersome, making them difficult to use for many applications, including food related applications. Therefore, dry ice is now commonly sold as pellets for easy handling and manipulation. Specialized machines, called dry ice pelletizers, are used to produce dry ice in pellet form.

In a dry ice pelletizer such as that disclosed in U.S. Pat. No. 4,780,119 to Brooke and assigned to TOMCO Equipment Co., liquid $CO_2$ is injected into a chamber, known as the extrusion cylinder, and flashed at atmospheric pressure. In this process, a part of the $LCO_2$ changes phase to a solid ("snow") while the remaining portion changes phase to $CO_2$ gas. The $CO_2$ gas exits the extrusion cylinder through a plurality of gas vents. The proportionate amount of gaseous $CO_2$ versus snow depends on the pressure and temperature of the $LCO_2$ that is fed into the extrusion cylinder and the surrounding temperature of the extrusion cylinder—the lower the pressure and temperature, the greater the amount of snow produced in the flashing process.

When $LCO_2$ is flashed under ideal conditions at atmospheric pressure, approximately 48% of the $LCO_2$ is changed to snow while approximately 52% of the $LCO_2$ is changed to gas. Because the percent of snow formation is directly proportional to the pressure inside the extrusion chamber where flashing occurs, it is important the pressure inside the extrusion chamber be kept as close to atmospheric pressure as possible. Therefore, any gas vents on the extrusion chamber must be free from obstruction by the snow particles that can become lodged in the vents.

Once the snow is formed in the compression cylinder, a piston is used to compact the snow into a block of dry ice. After forming the block of dry ice, the piston further pushes the block of dry ice against a die located at the end of the extrusion cylinder, opposite the piston. The block of dry ice is extruded through the die to form dry ice pellets. The pellets fall out of the cylinder and are collected and packaged for distribution to consumers.

As in any commercial endeavor, the faster the rate of production, the "better" the machine. Many physical features of the Brooke machine (U.S. Pat. No. 4,780,119) limit the rate of dry ice pellet production. For example, the Brooke machine has only one injection port for injecting the $LCO_2$ into the compression cylinder. Because the rate of snow formation directly depends on the rate of $LCO_2$ injection into the extrusion cylinder, the speed of the Brooke machine is limited by the single injection port. In addition, the Brooke machine contains a limited number of venting holes for venting the $CO_2$ gas formed as a result of the flashing process, thereby increasing the amount of time needed for the flashing process, resulting in a decreased production rate.

U.S. Pat. No. 5,845,516 to Allen increases the production rate of the Brooke machine by adding an additional injection port to the compression cylinder, thereby increasing the rate by which the $LCO_2$ is injected and snow is formed. While U.S. Pat. No. 5,845,516 increased the injection rate of the $LCO_2$, it did not increase the rate by which the $CO_2$ gas is vented out of the injection port. If the $CO_2$ gas cannot be quickly vented, then the pressure inside the compression cylinder increases and lowers the amount of snow formed in the flashing process. Thus, although U.S. Pat. No. 5,845,516 increased the $LCO_2$ injection rate, the limited $CO_2$ venting rate continues to restrict the production rate of U.S. Pat. No. 5,845,516.

U.S. Pat. No. 5,548,960 to Anderson et al. attempts to increase the venting rate by using two cylinders—one for flashing the $LCO_2$ into snow and the other for compacting the snow into dry ice pellets. The cylinder used to flash the $LCO_2$ is completely porous, allowing a 360° venting area of the $CO_2$ gas. However, the Anderson patent has both practical and commercial limitations.

First, dry ice pelletizers are expensive machines. In order to use an Anderson machine to increase production, a dry ice producer must retire all his TOMCO machines (used by a majority of dry ice pellet producers) and purchase the new Anderson machine. This usually is not an economically practical solution for increasing the production rate.

Second, the Anderson patent cannot physically operate as fast as it claims to operate. The Anderson machine is made of two cylinders, one for flashing the $LCO_2$ and the other for compacting and extruding the snow. In order to increase production rate, not only must snow be formed quickly in the first cylinder, snow must be compacted and ice pellets extruded at that increased rate in the second cylinder. In practice, $LCO_2$ can be flashed into snow much faster than snow can be compacted and formed into pellets. Thus, the extrusion cylinder in the Anderson machine forms a bottleneck in the production process. As a result, the dry ice pellet production rate is not significantly increased by the Anderson machine.

Finally, in the Anderson machine, snow is likely to become lodged in the venting holes of the venting cylinder. The Anderson venting cylinder is made of a porous plastic material having tortuous and irregular shaped air passages. For all dry ice pelletizers, as a result of the rapid rate of $CO_2$ gas formation in the flashing process, snow is likely to be blown into the venting holes or passages and block the passages, thereby reducing the venting rate, increasing the pressure inside the extrusion cylinder, and lowering the dry ice production rate. The tortuous and irregular air passages of the Anderson venting cylinder is particularly likely to cause blockage of the vent holes. Thus, while the Anderson machine may promise a faster production rate, the venting hole blockage problem actually reduces the snow, and therefore dry ice pellet, production rate.

SUMMARY OF THE INVENTION

It is therefore an object of the present invention to provide a machine that can increase the dry ice production rate of dry ice pelletizers.

It is another object of the present invention to increase the production rate of existing dry ice pelletizers without requiring the dry ice producer to purchase new, expensive machinery.

It is another object of the present invention to provide a method of retrofitting existing TOMCO dry ice pelletizers and increase the venting area of the extrusion cylinder in order to increase dry ice production rate.

It is yet another object of the present invention to provide extrusion cylinders having venting holes that will not be blocked by snow formed in the flashing process.

In satisfaction of the above objectives, the present invention is a dry ice pelletizer having a 360° wire venting mesh for faster venting of $CO_2$ gas from the extrusion cylinder, resulting in an increased production rate.

Conventional dry ice pelletizers such as the type sold by TOMCO Equipment Co. generally consists of a die, an extrusion cylinder, a piston, an extrusion flange, spreader bars, a hydraulic mounting flange, hydraulics to move the piston, and at least one power source. The various parts are connected to each other and secured to a frame via the extrusion flange and the hydraulic mounting flange. In addition, a computerized control box may also be attached to the dry ice pelletizer to (a) control the movement of the piston (b) to time and control the injection of $LCO_2$, and (c) to detect and control the inner pressure in the extrusion cylinder.

The present invention focuses on the extrusion cylinder. In the prior art, the extrusion cylinder is attached to a die holder at one end and an extrusion flange at the other end. A piston is slidably attached to the extrusion cylinder in such a way that the piston can slidably move from one end of the extrusion cylinder to the other end of the extrusion cylinder, near, but not quite touching, the die holder. The cylinder is held together by four prestressed rods located apart from each other and in a generally uniform formation. The extrusion cylinder itself has at least one injection port and at least one pressure sensing hole. The injection port is used to inject $LCO_2$ into the extrusion cylinder while the pressure sensing hole allows pressure sensing equipment to access and detect the inside pressure of the extrusion cylinder. If the inside pressure is too high, then the injection of $LCO_2$ is temporarily stopped to allow the internal pressure to decrease below the triple point for $CO_2$. In this way, the production of snow is maximized while the production of gas $CO_2$ is minimized. Finally, in the prior art, a plurality of venting holes are located at the top portion of the extrusion cylinder, between the pressure sensing hole and the home position of the piston. The present invention improves on this venting hole feature of the extrusion cylinder.

The improved venting device generally consists of a specially designed wire mesh having a 360° venting area, a forward flange, a rear flange, and spacer tubes. The forward flange and the rear flange are mirror images of each other. Both flanges have orifices where the prestressed rods can pass through the flanges. The spacer tubes connect the two flanges to each other and fit over the rods. The venting mesh rests loosely along the axial length of the cylinder. Finally, one flange is securely attached to the extrusion cylinder and the other flange is securely attached to a home cylinder.

Looking closer at the venting mesh, in the preferred embodiment it is a circle of wires placed parallel to each other and bordered by two larger rings at each end. A plurality of bars are placed between the rings at spaced apart and periodic intervals to strengthen and prevent deformation of the cylindrical shape of the venting mesh. The parallel wires have a generally tooth shaped cross section, with the top of the tooth pointing towards the cross-sectional centerpoint of the venting mesh. The shape and configuration of the wire mesh allows snow to be blown out of the mesh without clogging up the openings of the mesh.

In an alternative embodiment, a wire or wires spiral from one end ring to the other end ring. Again, the wire has a tooth shaped cross section with the top of the tooth being toward the center of the cylinder. Horizontal rods extend from one end ring to the other end ring outside the spiraling wire or wires to provide radial support thereto.

In order to retrofit the mesh onto an existing machine, the original extrusion cylinder is first detached from the extrusion flange and the die holder and removed from the machine. Then, a home cylinder is attached to the extrusion flange. Next, the rear flange is slid through the four rods and attached to the home cylinder. Thereafter, the venting mesh is attached to the rear flange and, more or less simultaneously, the four spacer tubes are slid onto the four rods to rest against the rear flange. The forward flange is then slid onto the four rods and secured into place next to the spacer tubes and the venting mesh. The flanges and spacer tubes prevent the venting mesh from buckling under the pressure applied to the equipment by the four prestressed rods. A shortened cylinder is then attached to the forward flange at one end and attached to the die holder at the other end. Finally, the four rods are secured to the die holder.

BRIEF DESCRIPTION OF THE DRAWINGS

FIG. 4 shows a close up perspective view of the wire mesh of the present invention.

FIG. 4A shows an alternative wire mesh in a perspective view.

FIG. 5 shows an enlarged cross sectional view of the wire mesh.

DETAILED DESCRIPTION OF THE PREFERRED EMBODIMENT

Figure 1:
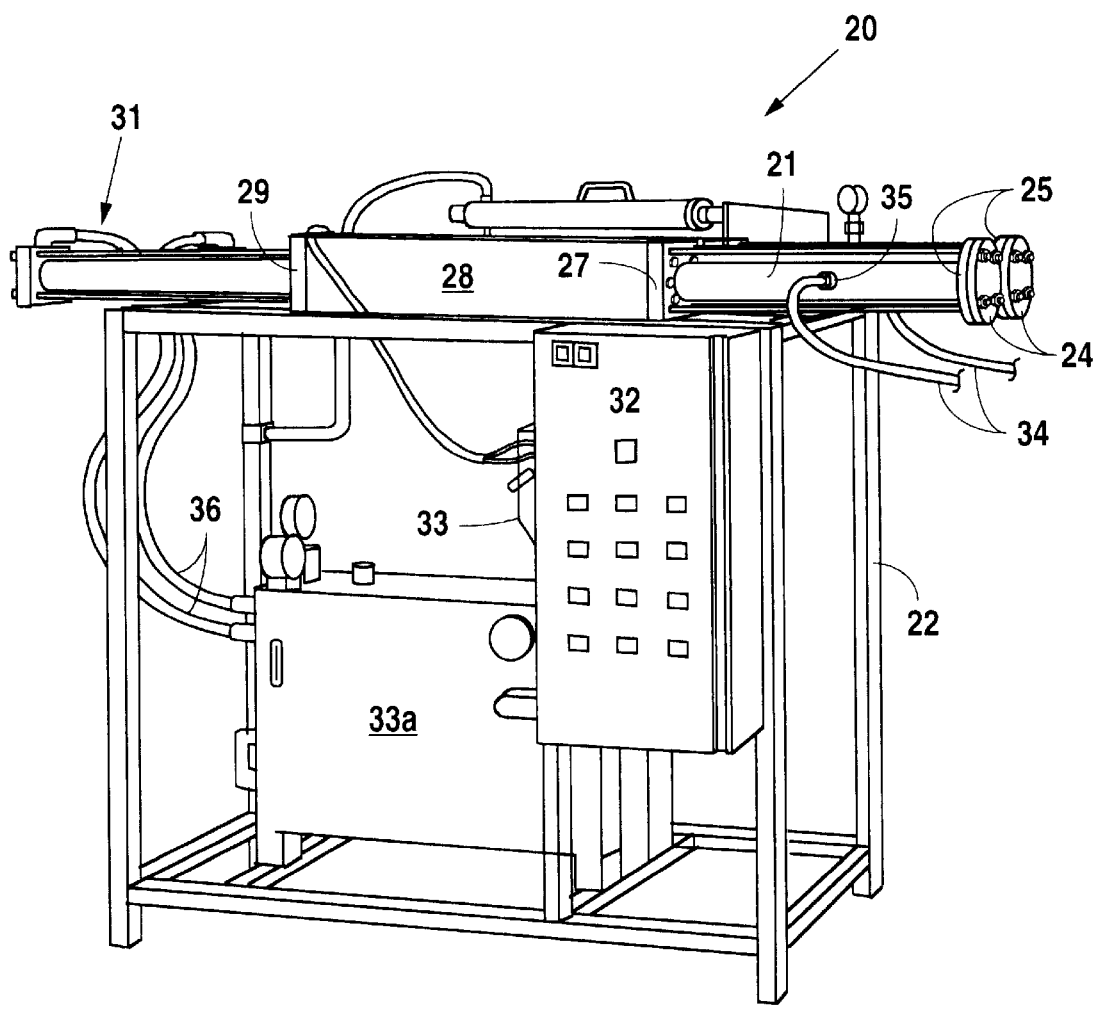
FIG. 1 shows a perspective view of a TOMCO type dry ice pelletizer attached to a prior art extrusion cylinder.
Figure 2:
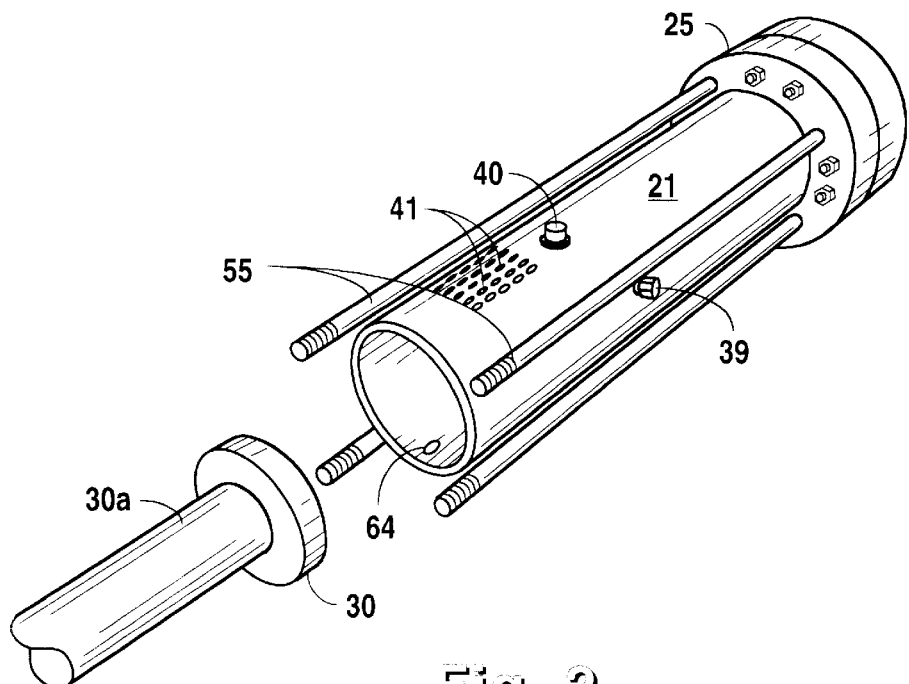
FIG. 2 shows a perspective view of the extrusion cylinder portion of the prior art dry ice pelletizer.

FIG. 1 shows a perspective view of a commercially available, widely used, dry ice pelletizer 20 having two extrusion cylinders 21 having venting holes 41 (See FIG. 2). Pelletizer 20 is generally available for purchase from companies such as the TOMCO Equipment Company. Because of its wide availability in the marketplace, pelletizer 20 will only be generally described below. Pelletizer 20 generally consists of dies 24, die holders 25, an extrusion cylinder 21, extrusion flange 27, spreader box 28, hydraulic mounting flange 29, piston 30 (see FIG. 2), hydraulics assembly 31, control box 32, at least one motor 33 and hydraulic tank 33a. All of the foregoing components are supported by frame 22.

Briefly, to operate pelletizer 20, $LCO_2$ is first delivered to extrusion cylinder 21 through $LCO_2$ feed hoses 34 and injected into extrusion cylinder 21 via at least one injection connector 35. The $LCO_2$ is then flashed in extrusion cylinder 21, and snow is formed. Through venting holes 41 (see FIG. 2), excess $CO_2$ gas may be collected, recompressed, and reused. A hood may be located generally on top of extrusion cylinder 21, over venting holes 41 (see FIG. 2).

Extrusion cylinder 21 is attached at one end to die 24 via die holder 25 and at its opposite end to spreader box 28 via extrusion flange 27. Extrusion cylinder 21 slidably receives a piston 30 (see FIG. 2), which piston 30 is attached to a rod 30a. Extrusion cylinder 21 is attached to extrusion flange 27 by rods 55. Extrusion cylinder 21 has at least one injection port 39, a pressure sensing hole 40, and a plurality of venting holes 41 (see FIG. 2). Liquid $CO_2$ is delivered from an outside source into extrusion cylinder 21 through injection port 39 via $LCO_2$ feed hoses 34 and injection connector 35. After the $LCO_2$ flashes to snow, the $CO_2$ gas formed as a result of this process is vented out of extrusion cylinder through venting holes 41. A hood (not shown) may be placed generally on top of venting holes 41 to capture the vented $CO_2$ gas. The captured $CO_2$ gas may then be recompressed and reused to make more dry ice.

Piston 30 is slidably received in extrusion cylinder 21 and moves from one end of extrusion cylinder 21 to the other end of extrusion cylinder 21. The piston strokes are moved by hydraulics assembly 31, which is attached to piston rod 30a at the end opposite to piston 30.

Hydraulics assembly 31 is attached to frame 22 via hydraulics mounting flange 29. Piston rod 30a is coupled to another rod (not shown) in spreader box 28. Piston rod 30a is not continuous to avoid excessive heat transfer along the piston rod 30a. Spreader box 28 is attached on each end to hydraulics mounting flange 29 and extrusion flange 27. Piston rod 30a is located generally parallel with the spreader box 28. Spreader box 28 is used to prevent heat transfer from the extrusion cylinder 21 to the hydraulics assembly 31. Spreader box 28 is secured to frame 22 by any convenient means.

When pelletizer 20 is in production, extrusion cylinder 21 is constantly being filled by snow at extremely low temperatures, and the snow tends to lower the temperature of anything it comes into contact with, including extrusion cylinder 21, piston 30, and piston rod 30a. If hydraulics assembly 31 were connected directly to extrusion cylinder 21, then the low temperature of extrusion cylinder 21 would transfer to hydraulics assembly 31 through piston rod 30a, thereby freezing the lubricating oil inside hydraulics assembly 31. The frozen lubricating oil becomes abrasive and will wear out a seal in a short period of time. To solve this problem, when spreader box 28 is used to separate extrusion cylinder 21 from hydraulics assembly 31, along with a coupling between rods, to lessen the temperature transfer between extrusion cylinder 21 and hydraulics assembly 31, which prevents the lubricating oil from freezing.

Motor 33 runs a pump (not shown) which is attached to a plurality of hoses 36. Motor 33 via the pump controls the hydraulic fluid in hydraulics assembly 31 used to reciprocate piston 30 via piston rod 30a (see FIG. 2).

Piston 30 movement and $LCO_2$ injection are controlled and coordinated by a computer software located inside the memory bank of control box 32. Thus, for example, if the pressure inside extrusion cylinder 21 is too high (and this is detected by measuring instruments connected to control box 32), control box 32 automatically stops the injection of $LCO_2$ into extrusion cylinder 21 until the internal pressure of extrusion cylinder 21 drops below the triple point of $CO_2$.

FIG. 2 shows a close-up, perspective view of the prior art extrusion cylinder 21. Extrusion cylinder is attached to die holder 25 at one end and at the other end to extrusion flange 27 (see FIG. 1). Four prestressed rods 55 are located in a generally square and spaced apart formation surrounding extrusion cylinder 21. Extrusion cylinder 21 has at least one $LCO_2$ injection port 39 located at a side of extrusion cylinder 21. Injection port 39 is for injecting and flashing $LCO_2$ to solid and gaseous $CO_2$. A pressure sensing hole 40 is located generally on top of extrusion cylinder 21. Pressure sensing hole 40 is to allow access of a pressure sensing device (not shown) to measure the internal pressure of extrusion cylinder 21. If the internal pressure is above the triple point, control box 32 will temporarily stop the injection of $LCO_2$ to prevent a large quantity of $CO_2$ gas from being formed but very little snow.

In the prior art, a plurality of venting holes 41 are located at generally the top of extrusion cylinder 21, between pressure sensing hole 40 and extrusion flange 27. Venting holes 41 are to allow the $CO_2$ gas formed as a result of the flashing process to escape into the atmosphere without increasing the internal pressure of extrusion cylinder 21.

Dry ice pellets are produced each time piston 30 completes a stroke in extrusion cylinder 21. The stroke begins with piston 30 in its fully retracted position, near extrusion flange 27, and with snow completely filling extrusion cylinder 21. The computer program in control box 32 sends a command to initiate the compression stroke of piston 30.

This compression stroke first compacts the lose snow in extrusion cylinder 21 into a block of dry ice. Then, piston 30 exerts additional pressure on the block of dry ice. Then, piston 30 pushes the block of dry ice through die 24. Die 24 forms the block of dry ice into small cylinders which break off into pellets that are ready for consumer use.

The compression stroke of piston 30 ends near, but not at, die 24. A small block of dry ice, called a "puck," is left next to the die 24 to prevent the snow subsequently formed in extrusion cylinder 21 from escaping through the die 24.

After the compress stroke is complete, the computer program in control box 32 initiates the return stroke. As soon as piston 30 passes injection port 39, the program in control box 32 opens up injecting port 39 to allow $LCO_2$ to travel from the $LCO_2$ source through $LCO_2$ feed hoses 34 and injection connector 35 into extrusion cylinder 21, where the $LCO_2$ is flashed into snow. Simultaneous with flashing the $LCO_2$, the $CO_2$ gas formed as a part of the flashing process is vented out of extrusion cylinder 21 through venting holes 41. Injection port 39 is shut off once snow fills extrusion cylinder 21. Then the entire process described above is repeated again and again.

Figure 3:
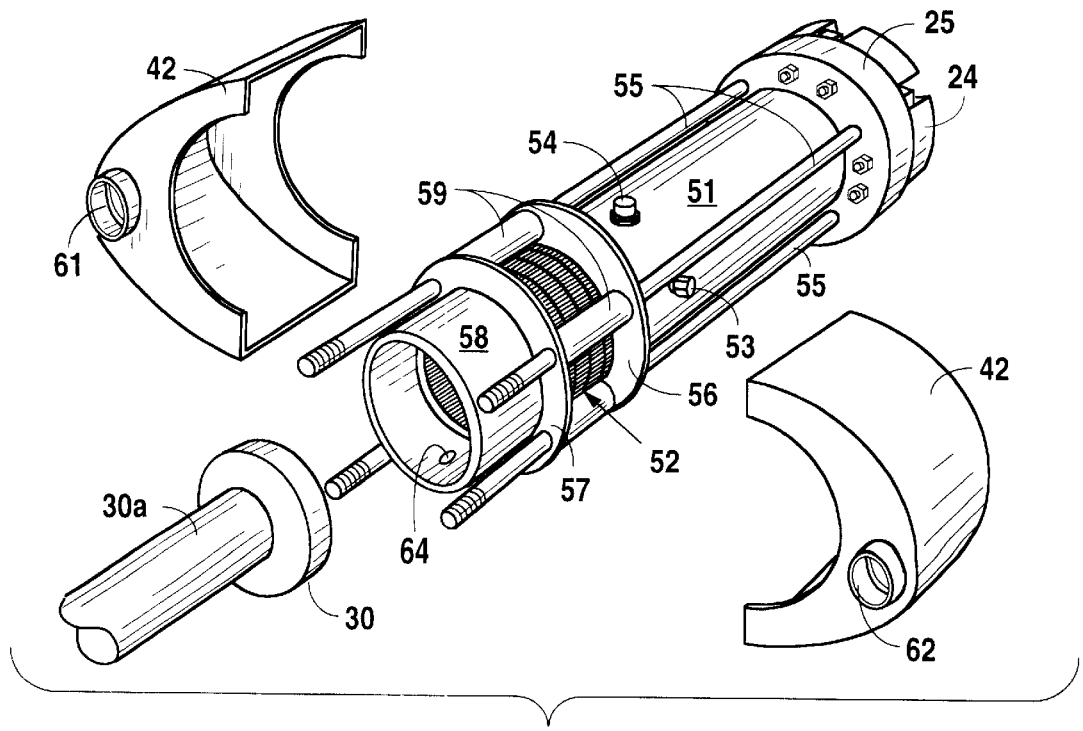
FIG. 3 shows a partial exploded perspective view of the extrusion cylinder portion of the dry ice pelletizer of the present invention.

FIG. 3 is a perspective view of the preferred embodiment of the present invention, with left and right portion of hood 42 opened to allow viewing of the inner portion of the present invention. The present invention has die holder 25 located and connected to one end of an extrusion cylinder 51. However, extrusion cylinder 51 is generally shorter in length than prior art extrusion cylinder 21. The shorter length is to accommodate the 360° venting mesh 52 of the present invention. Extrusion cylinder 51 has at least one injection port 53 for the injection of $LCO_2$ into extrusion cylinder 51, but additional injection ports may be used to speed up the injection process. Injection port 53 is located generally at a side of extrusion cylinder 51. Further, extrusion cylinder 51 has pressure sensing hole 54 to allow a pressure sensing instrument access to measure the internal pressure of extrusion cylinder 51. Pressure sensing hole 54 is located generally at the top of extrusion cylinder 51.

Four prestressed rods 55 are located in a square formation, generally parallel and apart, and generally equidistant from the center of the cross section of extrusion cylinder 51. Rods 55 extends the entire length of extrusion cylinder 51, venting mesh 52, and extrusion flange 27. Rods 55 are tension prestressed to prevent elongation of extrusion cylinder 51 caused by piston 30 constantly pushing against the snow, die 24, and die holder 25.

Forward flange 56 is located between extrusion cylinder 51 and venting mesh 52. Forward flange 56 is a generally flat, annular device, contoured to snugly and compressively engage extrusion cylinder 51 on one side of its inner diameter and loosely engage venting mesh 52 along the axial length of extrusion cylinder 51 on the opposite side of the inner diameter of forward flange 56. The radius of forward flange's 56 inner diameter is the same as the inside radius of extrusion cylinder 51. Forward flange 56 has four holes located at generally the same place as rods 55 to allow rods 55 to pass through forward flange 56. An O-ring is placed on each side of forward flange 56 to prevent $CO_2$ gas from escaping around forward flange 56. Finally, each hole is contoured to snugly receive an end of a spacer tube 59. (Spacer tubes 59 will be described in more detail later.)

Rear flange 57 is generally of the same size and shape and made of generally the same material as forward flange 56. In fact, rear flange 57 is a mirror image of forward flange 56. Rear flange 57 is contoured to snugly engage home cylinder 58 via a compression seal on one side of its inner diameter and contoured to loosely engage in an axial direction venting mesh 52 on the opposite side of its inner diameter. Rear flange 57 also has four holes to accommodate the passage of rods 55 through rear flange 57. O-rings are also placed on each side of rear flange 57 to prevent gas from escaping. Each hole is contoured to snugly receive an end of a spacer tube 59.

Four spacer tubes 59 are located between forward flange 56 and rear flange 57, connecting forward flange 56 to rear flange 57 at the place rods 55 pass through forward and rear flanges 56 and 57, respectively. Spacer tubes 59 enclose the portion of rods 55 between forward flange and rear flange 56 and 57. Spacer tubes 59 are hollow and made of a material that can withstand the buckling forces caused by the compression of prestressed rods 55. Spacer tubes 59 must be made slightly longer than the length of venting mesh 52 in order to bear all the compressive forces exerted by rods 55 and allow venting mesh 52 to rest loosely between extrusion cylinder 51 and home cylinder 58 without experiencing any buckling forces.

Home cylinder 58 is attached to rear flange 57 via a compression seal. Home cylinder 58 provides a resting location for piston 30 when piston 30 fully retracts to its ready position. An orifice 64 is located at generally the bottom side of home cylinder 58. After forcing the compacted snow out of extrusion cylinder 51, piston 30 is retracted from its fully extended position. This retraction process often scrapes against the inside of extrusion cylinder 51, gathering random bits of remnant snow back into home cylinder 58. Orifice 64 provides an outlet for the snow from home cylinder 58.

Hood 42 is generally a hollow torus that can fit snugly over forward and rear flanges 56 and 57, respectively. Hood 42 has hose connections 61 and 62 to capture the gaseous $CO_2$ exiting venting mesh 52 for venting to the outside atmosphere or for recompression and reuse.

FIG. 4 shows an enlarged perspective view of venting mesh 52, which allows 360° venting. Venting mesh 52 has a forward ring 65 and a rear ring 66, with a plurality of spaced apart bands 67 located in between. Both forward ring 65 and rear ring 66 are circular bands with a certain width used to connect venting mesh 52 with forward and rear flanges 56 and 57. Bands 67 are used to sustain the cylindrical shape of venting mesh 52. However, bands 67 are not as wide as front and rear rings 65 and 66. It is important to note bands 67 may not be overly wide because the increase in width will decrease available venting area, thus slowing the venting rate of extrusion cylinder 51.

The venting mesh 52 has wires running from forward ring 65 to rear ring 66, in a direction generally perpendicular to forward ring 65, rear ring 66, and bands 67. Wires 68 are placed generally parallel and slightly spaced apart from each other. Finally, forward ring 65, rear ring 66, and intermediate bands 67 are all located on the outer surface of venting mesh 52 rather than along the inner side of venting mesh 52.

FIG. 5 shows an enlarged cross section view of wires 68 of venting mesh 52, along with one band 67. As seen in FIG. 5, wires 68 are generally tooth shaped in cross section, with all four corners being rounded. This "tooth shape" is similar in shape to the exposed portion of the front tooth of a grown human with good teeth. Further, wires 68 are placed with the smaller side facing outward. The rounded corners and the outward facing configuration prevent snow particles from being caught within the mesh, causing clogging and improper venting, thereby leading to an undesired rise in pressure inside extrusion cylinder 51. Further, with the base of the tooth shape facing outward, any snow particle that may pass through the smaller, more restrictive opening near the inner part of venting mesh 52 will be able to pass through the larger opening toward the outside of the venting mesh 52, thereby avoiding clogging up the mesh.

Venting mesh is well known in the art of wire meshes and is commercially available from wire mesh manufacturers such as U.S. Filter/Johnson Screens. Venting mesh is typically used in water wells to gather water while at the same time preventing solid particles from reaching inside the well casing. Here, the direction of venting mesh 52 is reversed to allow passage of only certain size particles from the inside of the cylinder to the outside of the cylinder.

Referring to FIG. 4A, an alternative venting mesh 52' is shown. In this alternative embodiment, the wire 68' spirals from forward ring 65 to rear ring 66. The spiral may be made of a single strand of wire 68 or multiple strands. The wire 68' has the same tooth shaped cross section as wire 68 of the preferred embodiment. Brace bars 70 connect to forward ring 65 and rear ring 66 to hold wire 68' in place in the spiral during use.

Figure 6:
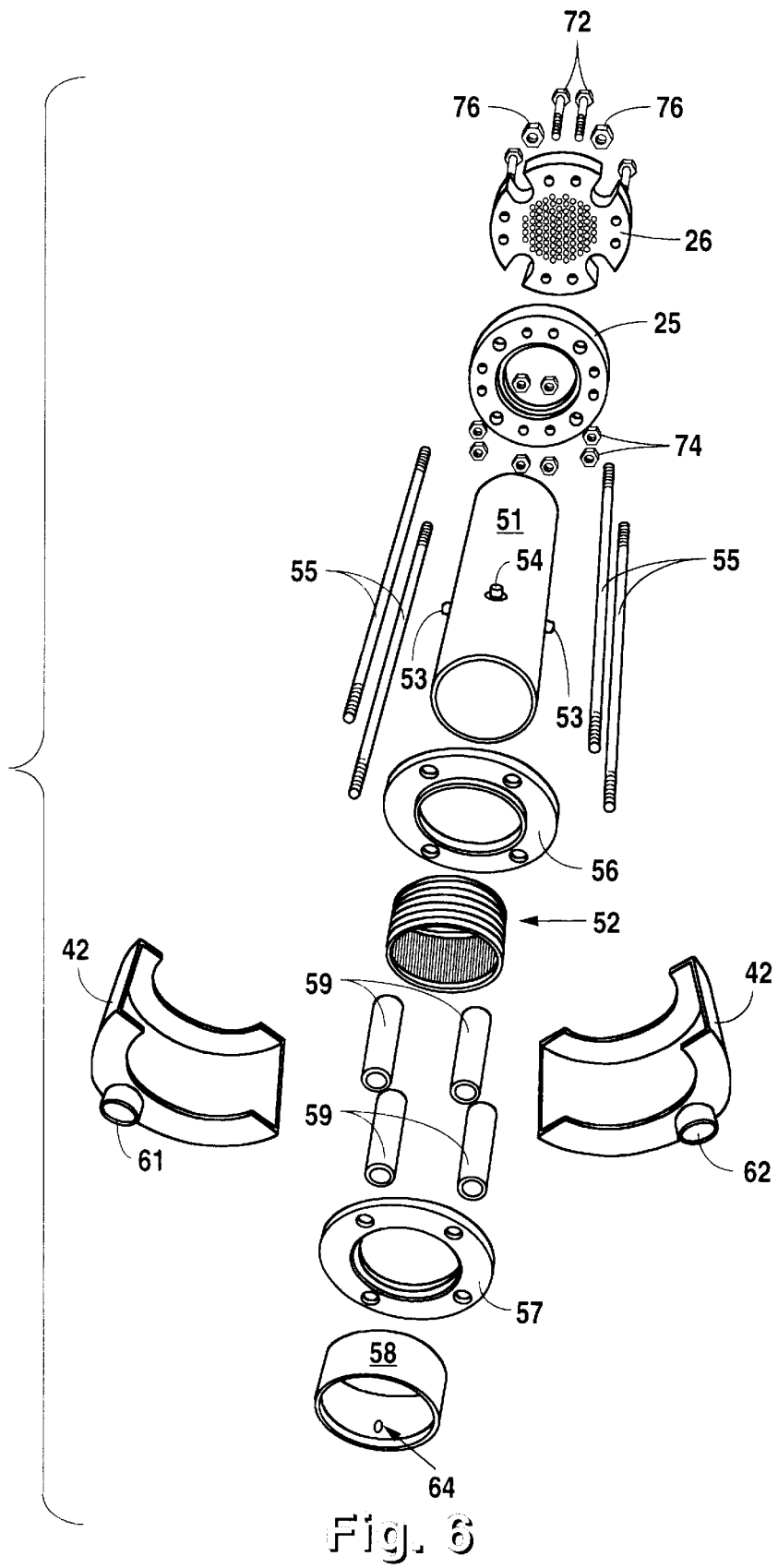
FIG. 6 shows an exploded perspective view of the extrusion cylinder portion of the dry ice pelletizer.

FIG. 6 is an exploded perspective view of the present invention illustrating the method by which the present invention may be retrofitted onto an existing machine. To retrofit an existing TOMCO type dry ice pelletizer 20 with the present invention, connections to extrusion cylinder 21 such as $CO_2$ feed hoses 34, injection connector 35, and pressure sensing equipment (not shown) are first disconnected (refer to FIG. 1). Then, the existing die 24, die holder 25, and extrusion cylinder 21 arc all disconnected from each other and from extrusion flange 27 and removed (see FIG. 1). Extrusion cylinder 21 is slidably disengaged from piston 30 (see FIG. 1).

After removing the existing prior art machine parts, home cylinder 58 is first slid between rods 55, over piston 30 and to extrusion flange 27. At the same time, home cylinder 58 slidably receives piston 30. Thereafter, rear flange 57 is slid onto rods 55 through the rear flange four orifices and snugly engaged to home cylinder 58. Spacer tubes 59 are then individually but more or less simultaneously slid onto each rod 55, one spacer tube 59 per rod 55, and against rear flange 57. Either before or after sliding spacer tubes 59 onto rods 55, venting mesh 52 is also slid in between rods 55 and loosely held by rear flange 57. Then, forward flange 56 is slid onto rods 55 through the forward flange four orifices. Forward flange 56 loosely holds venting mesh 52 and abuts all four spacer tubes 59. Next, extrusion cylinder 51 is placed between rods 55 and abuts forward flange 56. Die holder 25 and die 24 are slid onto rods 55 and four nuts 76 tightly fastened to the ends of rods 55 to hold everything in an abutting relationship along a longitudinal axis. Bolts 72 and nuts 74 hold the die holder 25 and die 26 together. Nuts 76 thread onto rods 55 to compressively hold everything together. Finally, $CO_2$ feed hoses 34 (see FIG. 1) and pressure sensing equipment (not shown) are reattached to their respective ports 53 and 54 on extrusion cylinder 51. Optionally, hood 42 may snugly cover the entire forward flange 56-venting mesh 52-rear flange 57 assembly. The dry ice pelletizer is now completely retrofitted with the present invention.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of retrofitting a dry ice pelletizer that forms dry ice pellets from a source of liquid $CO_2$ having the following steps:
    disconnecting an extrusion cylinder from a hydraulic cylinder and a die;
    removing liquid $CO_2$ lines from injection ports of said extrusion cylinder;
    replacing said extrusion cylinder with a shorter extrusion cylinder and a circumferential mesh attached to a second end of said shorter extrusion cylinder;
    reconnecting said hydraulics cylinder and said die to said shorter extrusion cylinder and said circumferential mesh, said die being located at a first end of said shorter extrusion cylinder; and
    reattaching said liquid $CO_2$ lines to said injection ports of said shorter extrusion cylinder, said injection ports operated by a controller, said controller moves a piston in a reciprocating manner inside said shorter extrusion cylinder by said hydraulics cylinder, said liquid $CO_2$ is injected into said shorter extrusion cylinder through said injection port and flashes inside thereof, and when said piston moves to said first end, solid $CO_2$ formed in said shorter extrusion cylinder as a result of said flashing is forced outward towards said die, when said piston moves to said second end, gaseous $CO_2$ escapes through said mesh, and the cycle repeats.

2. The method of retrofitting a dry ice pelletizer as recited in claim 1 further having the step of attaching a support structure adjacent to said circumferential mesh and at said second end of said shorter extrusion cylinder, said attaching step occurring prior to said reconnecting step.

3. The method of retrofitting a dry ice pelletizer as recited in claim 2 wherein said attaching step further comprises:
    attaching a rear flange to a second end of said circumferential mesh;
    securing a second end of a plurality of spacer tubes to said rear flange; and
    attaching a forward flange to a first end of said circumferential mesh, said forward flange further contacting a first end of said plurality of spacer tubes.

4. The method of retrofitting a dry ice pelletizer as recited in claim 1 further having the step of securing a hood around said circumferential mesh for gathering $CO_2$ gas expelled through said mesh.

5. The method of retrofitting a dry ice pelletizer as recited in claim 1 wherein said circumferential mesh has a tooth shaped cross section to prevent clogging thereof by particles of dry ice.

6. A dry ice pelletizer for forming dry ice from a source of liquid $CO_2$, said dry ice pelletizer having an external power source, said dry ice pelletizer comprising:
    a frame;
    at least one extrusion cylinder mounted on said frame, said extrusion cylinder having at least one injection port;
    a piston for slidably moving inside said extrusion cylinder;
    a die located on a first end of said cylinder opposite said piston therein;
    liquid $CO_2$ line for connecting said source of liquid $CO_2$ to said injection port;
    hydraulic cylinders mounted on said frame for reciprocating said piston inside said extrusion cylinder;
    a mesh surrounding a second end of said extrusion cylinder opposite said first end thereof, said mesh providing venting of gaseous $CO_2$ from said extrusion cylinder; and
    a controller for reciprocally operating said hydraulic cylinder from said external power source to move said piston in said extrusion cylinder in a compression cycle where when said piston is near said second end, said liquid $CO_2$ is injected into said extrusion cylinder through said injection port and flashes inside thereof, and when said piston moves to said first end, solid $CO_2$ formed in said extrusion cylinder as a result of said flashing is compressed into a solid block of dry ice and forced outward towards said die, when said piston moves to said second end, gaseous $CO_2$ escapes through said mesh and the cycle repeats; and
    a support structure adjacent said mesh for withstanding compressive forces of said extrusion cylinder, wherein said support structure comprises two flanges attached to each end of said mesh and a plurality of spacer tubes connected in between said flanges.

7. A dry ice pelletizer for forming dry ice from a source of liquid $CO_2$ as recited in claim 6 wherein said support structure is surrounded by a hood for gathering $CO_2$ gas expelled through said mesh.

8. A dry ice pelletizer for forming dry ice from a source of liquid $CO_2$, said dry ice pelletizer having an external power source, said dry ice pelletizer comprising:
    a frame;
    at least one extrusion cylinder mounted on said frame, said extrusion cylinder having at least one injection port;
    a piston for slidably moving inside said extrusion cylinder;
    a die located on a first end of said cylinder opposite said piston therein;
    liquid $CO_2$ line for connecting said source of liquid $CO_2$ to said injection port;
    hydraulic cylinders mounted on said frame for reciprocating said piston inside said extrusion cylinder;

a mesh surrounding a second end of said extrusion cylinder opposite said first end thereof, said mesh providing venting of gaseous $CO_2$ from said extrusion cylinder and wherein said mesh allows 360° venting of said $CO_2$ gas from said extrusion cylinder;

a controller for reciprocally operating said hydraulic cylinder from said external power source to move said piston in said extrusion cylinder in a compression cycle where when said piston is near said second end, said liquid $CO_2$ is injected into said extrusion cylinder through said injection port and flashes inside thereof, and when said piston moves to said first end, solid $CO_2$ formed in said extrusion cylinder as a result of said flashing is compressed into a solid block of dry ice and forced outward towards said die, when said piston moves to said second end, gaseous $CO_2$ escapes through said mesh and the cycle repeats; and a support structure adjacent said mesh for withstanding compressive forces of said extrusion cylinder.

9. A dry ice pelletizer for forming dry ice from a source of liquid $CO_2$ as recited in claim 8 wherein said support structure comprises two flanges attached to each end of said mesh and a plurality of spacer tubes connected in between said flanges.

10. A dry ice pelletizer for forming dry ice from a source of liquid $CO_2$ as recited in claim 9 wherein said mesh is comprised of generally parallel threads having a generally tooth shaped cross section.

11. A dry ice pelletizer for forming dry ice from a source of liquid $CO_2$ as recited in claim 10 wherein said support structure is surrounded by a hood for gathering $CO_2$ gas expelled through said mesh for venting of said $CO_2$ gas from said extrusion cylinder.

* * * * *